US009460606B2

(12) United States Patent  
Loomis

(10) Patent No.: US 9,460,606 B2  
(45) Date of Patent: Oct. 4, 2016

(54) PERISHABLE FOOD TIMING SYSTEM

(71) Applicant: Loominocity, Inc., Napa, CA (US)

(72) Inventor: Jason Loomis, Decatur, GA (US)

(73) Assignee: Loominocity, Inc., Napa, CA (US)

( * ) Notice: Subject to any disclaimer, the term of this patent is extended or adjusted under 35 U.S.C. 154(b) by 0 days.

(21) Appl. No.: 14/532,251

(22) Filed: Nov. 4, 2014

(65) Prior Publication Data

US 2016/0125717 A1    May 5, 2016

(51) Int. Cl.

| G08B 19/02 | (2006.01) |
| G08B 21/18 | (2006.01) |
| G08B 3/10 | (2006.01) |
| G08B 5/22 | (2006.01) |
| G08B 19/00 | (2006.01) |
| G06F 1/00 | (2006.01) |
| H04L 1/00 | (2006.01) |

(52) U.S. Cl.
CPC ............... G08B 21/18 (2013.01); G08B 3/10 (2013.01); G08B 5/22 (2013.01); G08B 19/00 (2013.01); G06F 1/00 (2013.01); H04L 1/00 (2013.01)

(58) Field of Classification Search
CPC .................................... H04L 1/00; G06F 1/00
See application file for complete search history.

(56) References Cited

U.S. PATENT DOCUMENTS

| 6,817,192 B2 | 11/2004 | Ector, Jr. et al. |
| 7,675,424 B2 | 3/2010 | Debord et al. |
| 2008/0279724 A1* | 11/2008 | Dicarlo ................ A61J 9/00 422/400 |
| 2010/0039252 A1 | 2/2010 | Barkus |
| 2010/0263244 A1 | 10/2010 | Tabirian et al. |
| 2011/0083564 A1* | 4/2011 | Kirby .................. A47J 39/006 99/468 |
| 2015/0078142 A1* | 3/2015 | Loomis ................ G04F 1/005 368/107 |

FOREIGN PATENT DOCUMENTS

| WO | WO-01/82004 A1 | 11/2001 |
| WO | WO-2012/156729 A1 | 11/2012 |

* cited by examiner

*Primary Examiner* — Shirley Lu
(74) *Attorney, Agent, or Firm* — Craige Thompson; Thompson Patent Law

(57) ABSTRACT

Apparatus and associated methods relate to a set of timers each corresponding to one of a set of visual indicia, and each timer configured to be associated with one or more predetermined timing thresholds associated with temporal hazards of a perishable food item. In an illustrative embodiment, each timer may have three timing thresholds, one associated with a room-temperature spoilage hazard, one with a refrigerator spoilage hazard, and one with a freezer spoilage hazard. In some embodiments, an identifying tag having one of the set of visible indicia may attach to a perishable food container. The identifying tag may be a color or a symbol attached to a nipple of a baby bottle, for example. In some embodiments, an alarm signal may be generated when the timer equals one of the predetermined timing threshold to advantageously warn a user that the associated temporal hazard may have occurred.

20 Claims, 7 Drawing Sheets

PERISHABLE FOOD TIMING SYSTEM

TECHNICAL FIELD

Various embodiments relate generally to timing devices, and specifically to a timing device for managing the expiration of perishable food items.

BACKGROUND

Timers are used in a variety of applications and products. Some timers, such as cooking timers are count-down times. Other timers, such as stop-watches are elapsed-time or count-up timers.

Many food items may be considered perishable, such as by having a finite life before spoilage. The length time before food perishes may vary with different climate environments. Dairy products, for example have a limited shelf life at room temperature conditions. But if refrigerated, dairy products may last for days, and perhaps even weeks. Some dairy products, such as cheese, milk, or butter, may be frozen. Frozen dairy products may have a long shelf life before spoiling. Spoilage of dairy products represent a temporal hazard that varies with environmental conditions.

SUMMARY

Apparatus and associated methods relate to a set of timers each corresponding to one of a set of visual indicia, and each timer configured to be associated with one or more predetermined timing thresholds associated with temporal hazards of a perishable food item. In an illustrative embodiment, each timer may have three timing thresholds, one associated with a room-temperature spoilage hazard, one with a refrigerator spoilage hazard, and one with a freezer spoilage hazard. In some embodiments, an identifying tag having one of the set of visible indicia may attach to a perishable food container. The identifying tag may be a color or a symbol attached to a nipple of a baby bottle, for example. In some embodiments, an alarm signal may be generated when the timer equals one of the predetermined timing threshold to advantageously warn a user that the associated temporal hazard may have occurred.

Various embodiments may achieve one or more advantages. For example, some embodiments may permit the use of a single timer for multiple climate environments. A timer may have a first predetermined timing threshold to provide notification of a first temporal hazard. For example, the first temporal hazard may be room temperature spoilage hazard. A second temporal hazard may be associated with a second predetermined timing threshold. In an exemplary embodiment, the second temporal hazard may be a refrigerator spoilage hazard. In some exemplary embodiments, a cover having a particular color representing visible indicia may be attachable to an infant bottle nipple. Each timer may then be associated with a color, which in turn may indicate that the timer is associated with the particular perishable item contained within the bottle having that color nipple attached thereto. In some exemplary embodiments, the cover having one or a set of visual indicia may be attachable to a food storage container, such as Tupperware.

In various embodiments, the timer may provide notification to an individual storing a perishable food item to facilitate proper management of perishable food items. For example, when storing multiple perishable food items in different climate environments, multiple predetermined timing thresholds may operate simultaneously to alert the individual of any temporal hazards. In some embodiments, a user may operate the timer through a user interface. For example, the user interface may be a software application on a handheld smart phone or computer tablet. In some exemplary embodiments, the user may access the timer and predetermined timing thresholds through a cloud storage application.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, the perishable food timer used in multiple climate environments is introduced with reference to FIG. 1. The, with reference to FIG. 2, a block diagram of a timer is illustrated. With reference to FIG. 3, the discussion turns to an exemplary embodiment that illustrates an identifying tag for a food container. Then, with reference to FIGS. 4-6, flowcharts detail exemplary processes and methods of operating the timing system. Finally, with reference to FIGS. 7A-7B, further exemplary embodiments of the identifying tag are illustrated.

Figure 1:
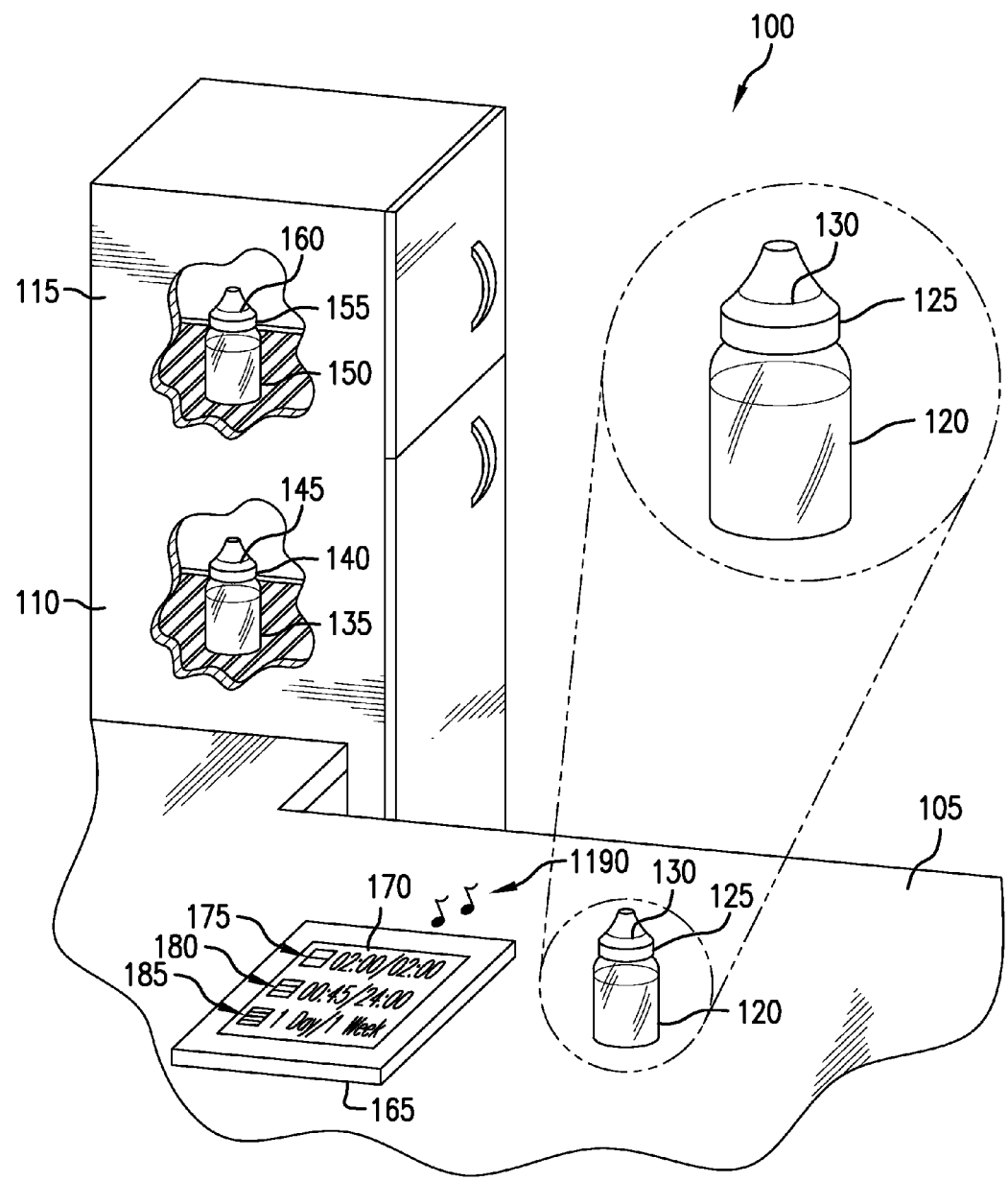
FIG. 1 depicts an exemplary application of a perishable food timer.

FIG. 1 depicts an exemplary application of a perishable food timer. In the figure, a kitchen 100 includes a countertop 105, a refrigerator 110, and a freezer 115. In the exemplary embodiment, an area around the countertop 105 represents a first climate environment, an area inside the refrigerator 110 represents a second climate environment, and an area within the freezer 115 represents a third climate environment. Each climate environment may be associated with a different ambient temperature. For example, the first climate environment may have a surrounding ambient temperature of room temperature, such as 70 degrees Fahrenheit. The second climate environment may have an ambient cooling temperature, such as 40 degrees Fahrenheit, for example. The third climate environment may have an ambient freezing temperature, such as 30 degrees Fahrenheit, for example.

Because, in part, of different ambient temperatures of the different climate environments, each climate environment may be associated with a different temporal hazard. For example, a perishable food item located within the first climate environment, such as the countertop 105, may have a temporal hazard associated with a two hour time until spoilage begins. In another example, a perishable food item located within the second climate environment, such as the refrigerator 110, may have a temporal hazard associated with a three day time until spoilage may begin. In another example, a perishable food item located within the third climate environment, such as the freezer 115, may have a temporal hazard associated with a six week time before spoilage may begin. In some exemplary embodiments, a temporal hazard may correlate to a safe time duration before spoilage of a food item may begin. In some embodiments, the duration or threshold for a temporal hazard may be predetermined. The threshold may be determined and programmed by a user in some embodiments. In other embodiments, the threshold may be determined and programmed by a factory setting, such as by being determined by historical research, for example. In some embodiments, the user may inform a software application as to the various climate conditions, from which the software application may determine the timing thresholds.

Illustrated is a first baby bottle 120 having a perishable food item therein, such as for example milk. The first baby bottle 120 is located on the countertop 105 in the first climate environment. In the exemplary embodiment, the food item within the first bottle 120 has a first temporal hazard associated with the first climate environment, the first temporal hazard being two hours for example. An identifying tag 125 is attached to the first bottle 120. The identifying tag 125 in the exemplary embodiment is in the shape of a nipple. The identifying tag 125 has a visible indicia 130. In the exemplary embodiment, the visible indicia 130 is in the shape of a single ring surrounding the identifying tag 125. In some embodiments, it may be advantageous to have a sealing cover attached to the bottle 120 during storage. The identifying tag 125 may be attached to the cover or comprise the cover in various embodiments.

Illustrated is a second baby bottle 135 having a perishable food item therein, such as for example milk. The second bottle 135 is located in the refrigerator 110 and thus in the second climate environment. In the exemplary embodiment, the food item within the second bottle 135 has a second temporal hazard associated with the second climate environment, the second temporal hazard being three days for example. An identifying tag 140 is attached to the second bottle 135. The identifying tag 140 in the exemplary embodiment is in the shape of a nipple. The identifying tag 140 has a visible indicia 145. In the exemplary embodiment, the visible indicia 145 is in the shape of a double ring surrounding the identifying tag 140. In some embodiments, it may be advantageous to have a sealing cover attached to the bottle 135 during storage. The identifying tag 140 may be attached to the cover or comprise the cover in various embodiments.

Illustrated is a third baby bottle 150 having a perishable food item therein, such as for example milk. The third bottle 150 is located in the freezer 115 and thus in the third climate environment. In the exemplary embodiment, the food item in the third bottle 150 has a third temporal hazard associated with the third climate environment, the third temporal hazard being six weeks for example. An identifying tag 155 is attached to the third bottle 150. The identifying tag 155 in the exemplary embodiment is in the shape of a nipple. The identifying tag 155 has a visible indicia 160. In the exemplary embodiment, the visible indicia 160 is in the shape of a triple ring surrounding the identifying tag 155. In some embodiments, it may be advantageous to have a sealing cover attached to the bottle 150 during storage. The identifying tag 155 may be attached to the cover or comprise the cover in various embodiments.

Also depicted is a computer 165 having a display 170. In an exemplary embodiment, the display 170 may incorporate a user interface by having a function enabling touch-screen. Shown on the display 170 is a first timing indicator 175 having a first representation of the first indicia 130 associated with the first climate environment. Next to the first indicia representation of the first timing indicator 175 is an elapsed time and a total time until the first temporal hazard indication will occur. For example, the elapsed time count is two hours and the predetermined threshold associated with the first temporal hazard is also two hours. Also on the display 170 is a second timing indicator 180 having a second representation of the second indicia 145 associated with the second climate environment. Next to the second indicia representation of the second timing indicator 180 is an elapsed time and a total time until the second temporal hazard indication will occur. For example, the elapsed time count is one day 6 hours and the predetermined threshold associated with the second temporal hazard is three days. Also on the display 170 is a third timing indicator 185 having a third representation of the third indicia 160 associated with the third climate environment. Next to the third indicia representation of the third timing indicator 185 is an elapsed time and a total time until the third temporal hazard indication will occur. For example, the elapsed time count is three weeks one day and the predetermined threshold associated with the third temporal hazard is six weeks.

In the exemplary embodiment, the elapsed time associated with the first climate environment in the first timing indicator 175 has reached the predetermined duration. In this case, an alarm 190 has been generated to alert the user that a predetermined threshold has been met on one or more of the perishable food items that has the index corresponding to the index of the timer. In some exemplary embodiments, each perishable food item may be associated with a different alarm 190. Different alarms 190 may comprise different audible tunes or sounds. In some exemplary embodiments, each perishable food item associated with a different climate environment may be associated with a different type of alarm 190. For example, a plurality of perishable food items located in the first climate environment may be associated with a first alarm and a plurality of perishable food items located in the second climate environment may be associated with a second alarm. In some exemplary embodiments, the alarm may be a vibratory type.

Figure 2:
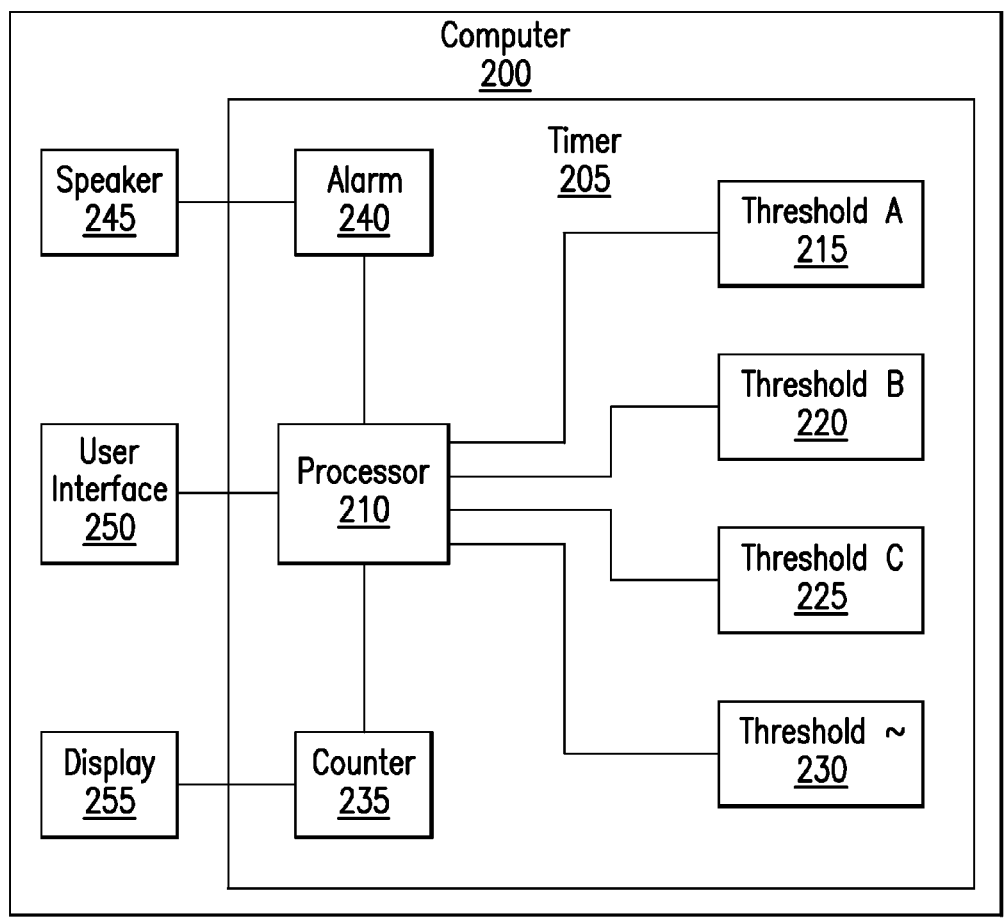
FIG. 2 depicts an exemplary block diagram of a computer having a perishable food timer.
Figure 3:
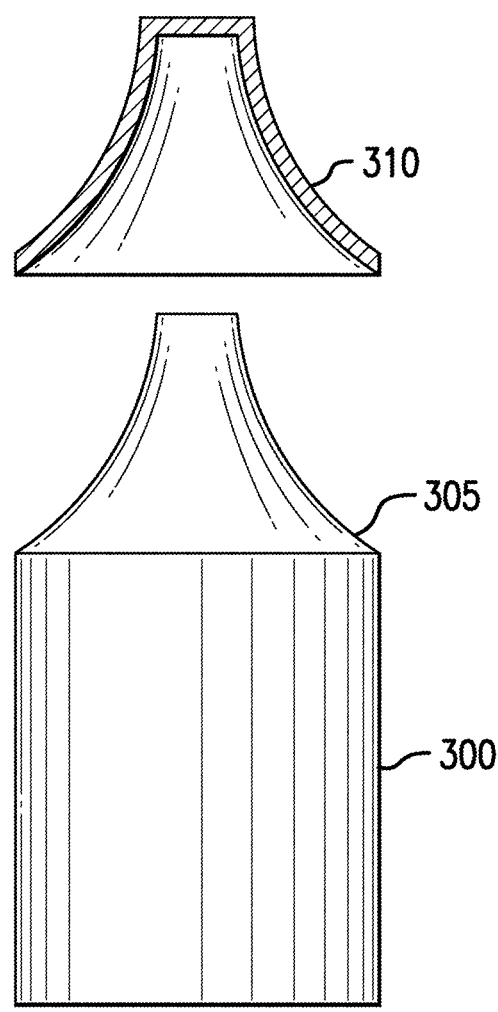
FIG. 3 depicts an exemplary view of an identifying tag attachable to a perishable food container.

FIG. 2 depicts an exemplary block diagram of a computer having a perishable food timer. A computer 200 is illustrated as having a timer 205. In some exemplary embodiments, the timer 205 may be used to alert a user of a temporal hazard associated with a perishable food item, such as for example potential spoilage of the food item due to prolonged exposure within a given climate environment. In an exemplary embodiment, the computer 200 may be a smart phone. In another exemplary embodiment, the computer 200 may be a computer tablet. In some exemplary embodiments, the timer 205 may be a software application downloadable to the computer 200 through a global area network.

The alarm 240 includes a processor 210, multiple predetermined threshold settings 215, 220, 225, 230, a counter 235, and an alarm 240. In an exemplary embodiment, a single threshold "A" 215, for example, which may be associated with a given climate environment may be selected by a user. The user may determine which threshold 215, 220, 225, 230 to choose based on a storing environment of a food item desired to be monitored for spoilage. In some embodiments, multiple thresholds 215, 220, 225, for example, may be compared with the elapsed time. In this way, a user may be alerted to hazards associated with different climate environments for a single perishable item. The user may move the item from a counter top to a refrigerator and then to freezer in response to the sequence of alarms.

In some embodiments, the user may select a single threshold for timer comparison. For example, if threshold "A" 215 is associated with a room temperature climate and the user desires to temporarily store the food item at room temperature, the user may desire to choose threshold "A" 215. In some exemplary embodiments, multiple different thresholds 215, 220, 225, 230 may exist for a common climate environment. For example, the spoilage durations or temporal hazard duration may be different for different food items stored at room temperature. For example, milk stored at room temperature may spoil faster than a banana stored at room temperature. In such cases, the threshold 215, 220, 225, 230 closest to a desired time duration may be chosen by the user. In other embodiments, the threshold 215, 220, 225, 230 may be adjusted by the user to a custom time duration representative of a duration when a temporal hazard becomes prevalent for the food item.

After one or more thresholds 215, 220, 225, 230 have been associated with a timer, signals indicative of a start timing command are sent to the processor 210 and a counter 235 simultaneously initiates an elapsed time count. The processor 210 has a comparator to compare the elapsed time count of the counter 235 with the associated timing threshold(s) 215, 220, 225, 230 to determine if said associated temporal hazard has occurred. Once the timing count meets or exceeds one of the threshold(s) 215, 220, 225, 230, an alarm 240 generates an alarm signal alerting the user that a temporal hazard may have occurred. The alarm 240 may be communicated to the user via a speaker 245, for example.

The computer 200 has a user interface 250 to permit the user to select a preferred timing threshold 215, 220, 225, 230. The user interface 250 may also permit the user to start/stop the counter 235. The user interface may permit the user to associate a timer with one of the visual indicia. In some exemplary embodiments, the user may view the selected threshold 215, 220, 225, 230 and the elapsed time of the counter 235. The display 255 may be a computer 200 screen in some embodiments. In some exemplary embodiments, the user interface 250 may be a touch-screen. In other exemplary embodiments, the user interface 250 may be a keyboard, or one or more control buttons.

FIG. 3 depicts an exemplary view of an identifying tag attachable to a perishable food container. A milk bottle 300 has a nipple 305 attached to an open end for dispensing of an internal fluid, such as for example milk. Attachable to the nipple 305 is an identifying tag 310. The identifying tag 310 is in the shape of a nipple cover. In some exemplary embodiments, the nipple cover may have an opening to align with the dispensing end of the nipple. The identifying tag 310 may include a visible indicia thereon. In an exemplary embodiment, the visible indicia is a particular color of the identifying tag 310. In another exemplary embodiment, the visible indicia is a particular pattern upon the identifying tag 310. The identifying tag 310 is illustrated as being removably attachable to the nipple 305. In some exemplary embodiments, the identifying tag 310 may attach to the nipple 305 via a snap-fit attachment. In some exemplary embodiments, the identifying tag 310 may include an adhesive layer to attach to the nipple 305. In some exemplary embodiments, the identifying tag 310 is in the form of a sticker. In some exemplary embodiments, the identifying tag 310 may be integrally formed with the nipple 305, wherein to change a displayed visible indicia the entire nipple 305 assembly including identifying tag 310 may need to be changed.

Figure 4:
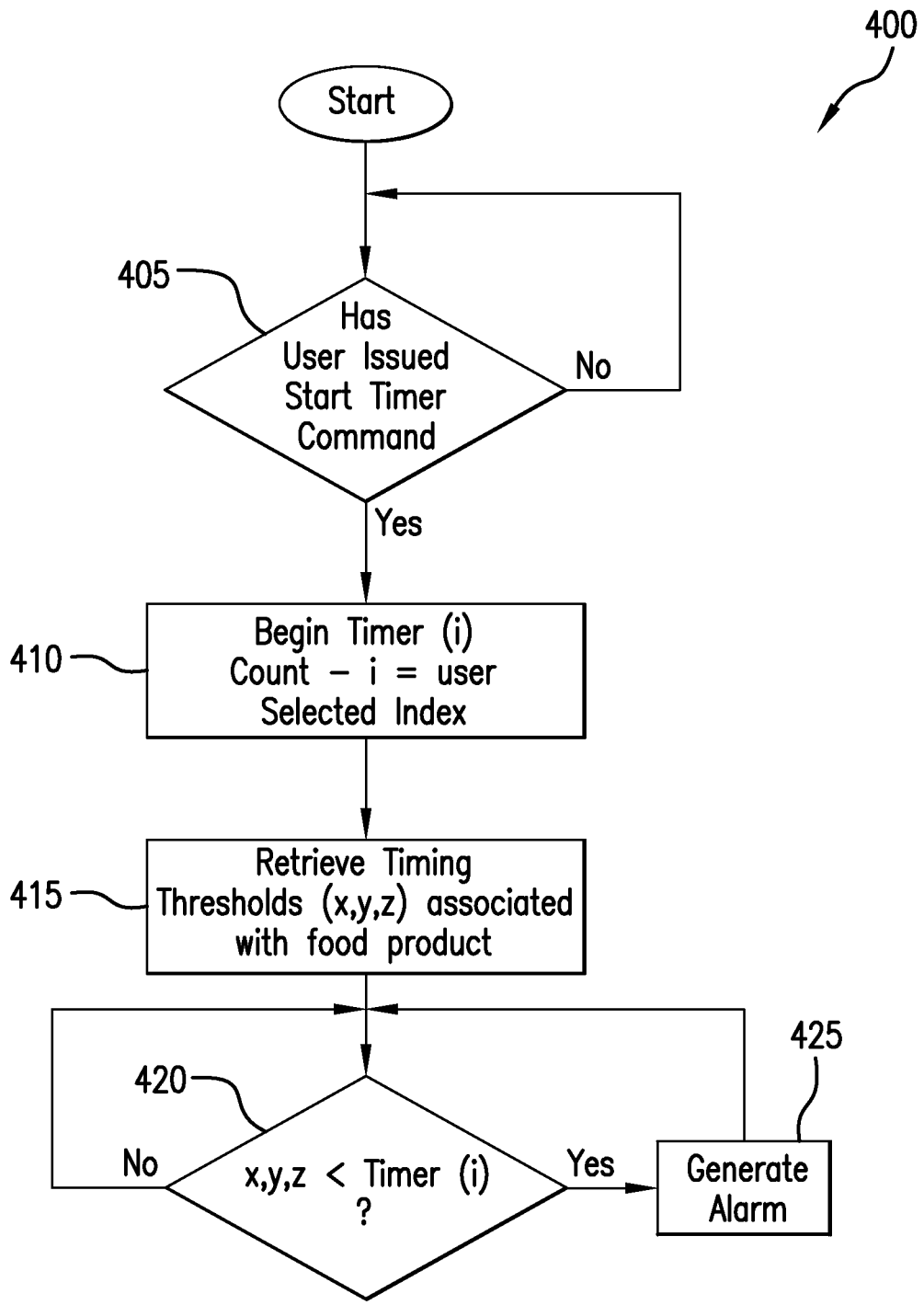
FIG. 4 depicts an exemplary method for timing a safe use condition of a perishable food item.

FIG. 4 depicts an exemplary method for timing a safe use condition of a perishable food item. The FIG. 4 flowchart depicts a method 400 for determining whether a programmed event associated with a perishable food item has occurred. The method is given from the perspective of the processor 210 of FIG. 2. The method 400 begins with the processor 210 waiting 405 for a user input from a user interface 250. If no input has been received by the processor 210, the processor returns to step 405. If, however, the processor receives a start timer command from the user interface, the processor 210 commences 410 a counter(i) associated with a particular visual indicator, i. The processor 210 then retrieves 415 a series of predetermined thresholds (in the depicted flow chart, thresholds x, y, and z), each of which is associated with a temporal hazard. Then the processor 210 compares 420 the elapsed time count with each of the predetermined thresholds, x, y, and z. If the elapsed time is equal to or greater than one of the predetermined thresholds x, y, and/or z, the processor 210 sends 425 an alarm signal to the user interface.

In some embodiments, a timer may have timing resolutions that are associated with different environmental conditions. For example, a timer may count in seconds when the timer is associated with a perishable item that is stored at room temperature. The timer may count in minutes when the timer is associated with a perishable item that is stored at a refrigerated environment. The timer may count in hours, for example, when the timer is associated with a perishable item that is stored at a frozen environment. In some examples, the increment rate of the timer is effected by the environmental condition.

Figure 5:
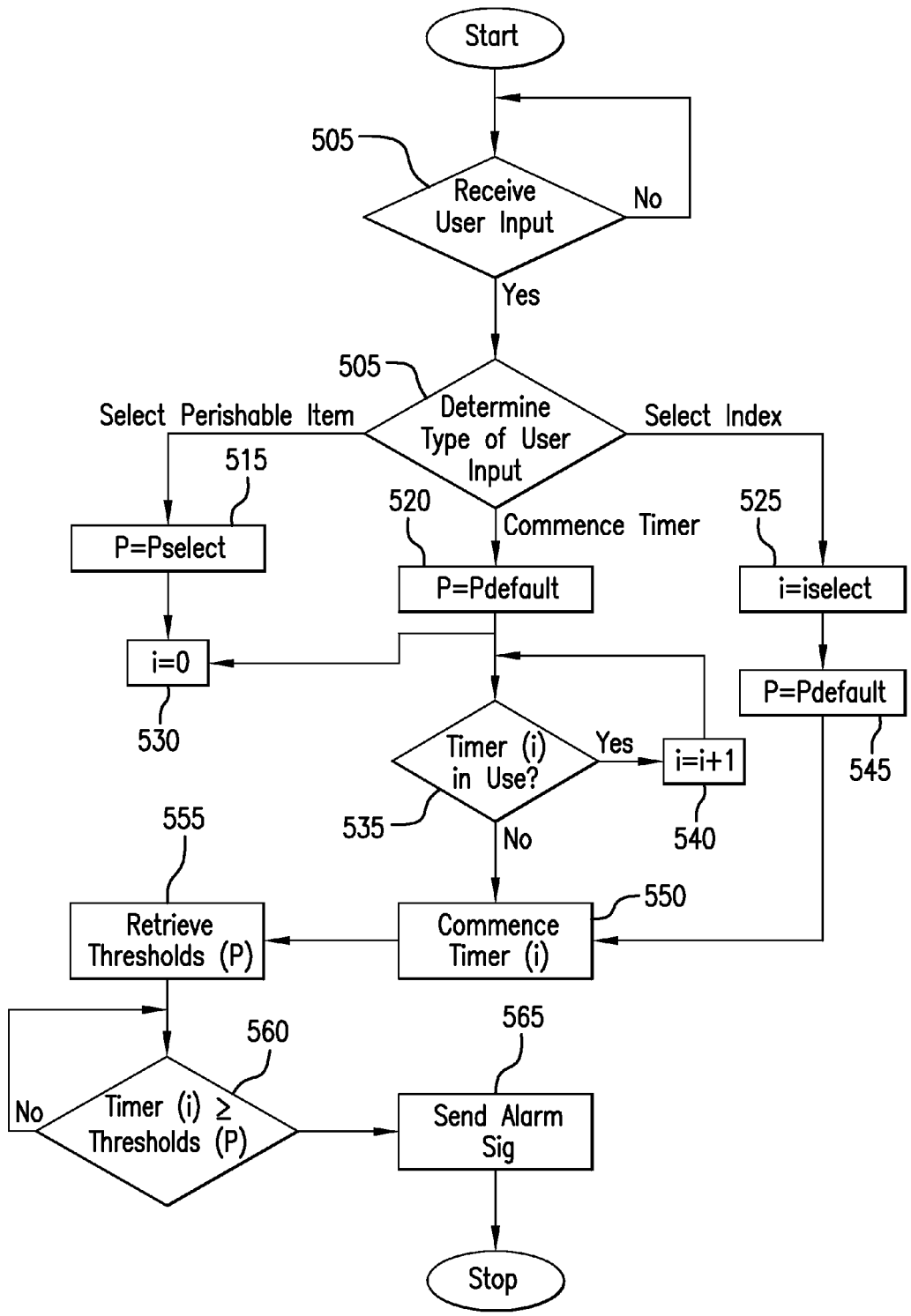
FIG. 5 depicts an exemplary method for timing a safe use condition of a perishable food item.

FIG. 5 depicts an exemplary method for timing a safe use condition of a perishable food item. The FIG. 5 flowchart depicts a method 500 for associating a set of predetermined thresholds with a timer. The method is given from the perspective of the processor 210 of FIG. 2. The method 500 begins with the processor 210 waiting 505 for the processor 210 to receive a user input. If a user inputs is received, the processor 210 then determines 510 the type of user input received. If the received user input is a selection of a perishable item, then the processor 210 assigns 515 a P index to $P_{selected}$. If, however, at step 510, the received user input is a commence timer command, then the processor 210 assigns 520 the P index to $P_{default}$. After steps 515 and 520, the processor next initializes 530 the index, i, to zero. Then the processor determines 535 if the timer(i) is already in use. If the timer(i) is determined to be already in use, the processor 210 increments 540 the index, i. If however, at step 535, the timer(i) is determined to be not in use, the processor then commences 550 timing user timer(i).

The processor 210 then retrieves 555 the thresholds(P) associated with the index, P. Then the processor 210 compares 560 the count of the commenced timer(i) with the retrieved thresholds(P). If, the timer(i) is less than the retrieved thresholds(P), then the processor returns to step 560. If, however, the timer(i) is greater than or equal to the thresholds(P), then the processor 210 sends 565 an alarm signal.

If, back at step 510, the processor 210 receives a select index command, the processor assigns 525 the index, i, to $i_{select}$. Then the processor 210 assigns 545 the index, P, to $P_{default}$. The processor 210 continues by commencing 550 the timer($i_{select}$).

Figure 6:
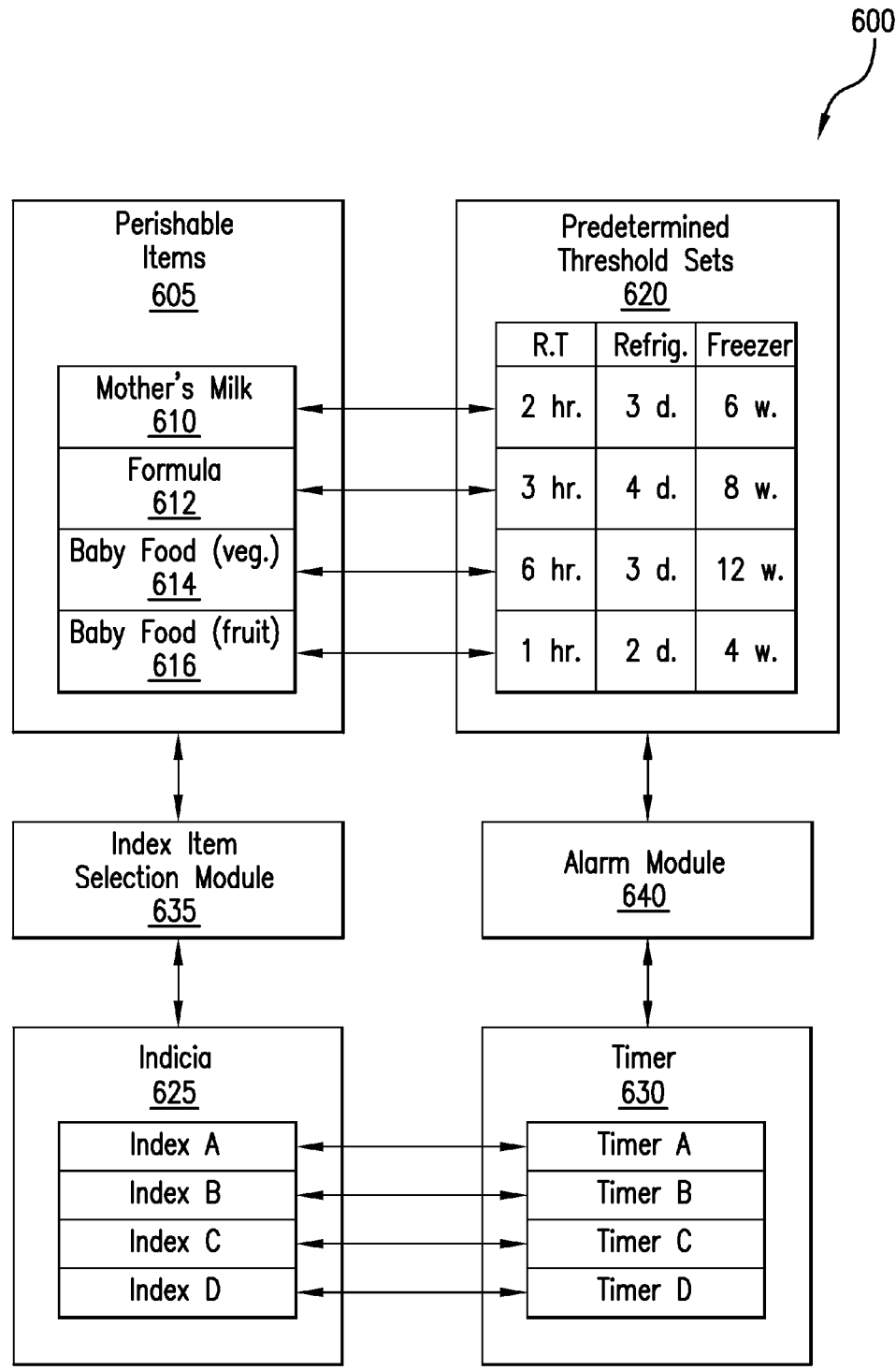
FIG. 6. depicts a block diagram of an exemplary multi-environment multi-timer of perishable items.

FIG. 6 depicts a block diagram of an exemplary multi-environment multi-timer of perishable items. In the FIG. 6 depiction, a multi-environment multi-timer 600 includes an exemplary list 605 of perishable items. The exemplary list 605 includes mother's milk 610, formula 612, vegetable baby food 614, and fruit baby food 616. The multi-environment multi-timer 600 also has a list of predetermined threshold sets 620, each of which is associated with one of the perishable items 610, 612, 614, 616 on the list 605. In the depicted embodiment, the predetermined thresholds sets include three predetermined thresholds, one each associated with a room temperature hazard, a refrigerated hazard, and a frozen hazard.

The multi-environment multi-timer 600 includes a list 625 of indicia and a plurality of timers 630, each of which is associated with one of the indicia of the list 625 of indicia. In some embodiments, the user may have physical tags that may be part of a perishable item container and/or attachable to a perishable item container. The physical tags may have indicia corresponding to the indicia of the list 625 of indicia. In an exemplary embodiment, when the user sends a command for a timer to commence timing, the user may attach a tag that has an index corresponding to the timer that commenced timing. In some embodiments, the user may select the timer that is associated with the index of a perishable item container, for example. The multi-environment multi-timer 600 has an index/item selection module 635 that may perform one or more of the above described methods of associating a timer with a particular tag.

The index/item selection module 635 may also associate one or more of the perishable items 610, 612, 614, 616 on the list 605 of perishable items with one or more indicia from the list 625 of indicia. When such an association has been made, the timer having the associated index may be associated with a particular perishable item 610, 612, 614, 616. By such an association, the timer may be associated with a particular set of predetermined thresholds that are operative measures of temporal hazards associated with the particular perishable item. In some embodiments, the index/item selection module 635 may have a default perishable item that is used in an event in which a user doesn't make a perishable item selection.

The multi-environment multi-timer 600 includes an alarm module 640. The alarm module 640 may compare the timing count of all commenced timers with the predetermined thresholds of all tagged perishable containers. The alarm module 640 may generate alarm signals when a commenced timer equals and/or exceeds one or more of the predetermined thresholds associated with the commenced timers. The generated alarm signals may be transmitted to a user interface, in some embodiments. The generated alarm signal may be wirelessly transmitted to a perishable container, in some embodiments. In an exemplary embodiment a perishable container may have an LED to indicate the storage time in relation to one or more temporal hazards. For example, a green LED may indicate that the perishable item has not experienced a temporal hazard. In some embodiments, a red LED may indicate that a perishable item has experienced a temporal hazard. In an exemplary embodiment, an audible alarm may indicate that a perishable item has experienced a temporal hazard.

Figure 7:
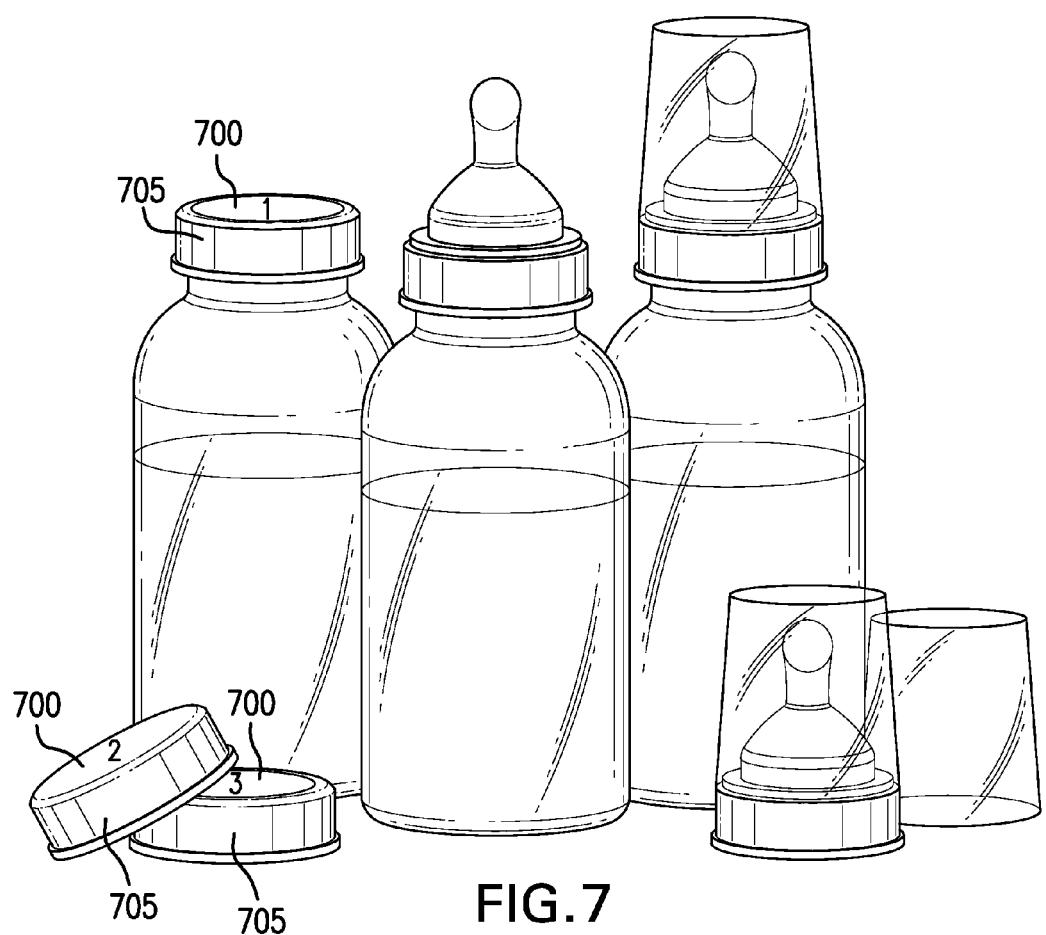
FIG. 7. depicts a perspective view of exemplary baby-bottle indicators on baby-bottle caps.

FIG. 7 depicts a perspective view of exemplary baby-bottle indicators on baby-bottle caps. In the FIG. 7 embodiment, baby-bottle indicators 700 are disposed on a face of a baby bottle cap 705. Each of the baby bottle indicators 700 are different from each other so that it can be uniquely identified. In the depicted embodiment, one of the indicators has an Arabic numeral '1', while another has an Arabic numeral '2', while a third has an Arabic numeral '3'. Various embodiments may use different symbols and/or methods of providing unique identification. The baby bottle caps 705 are configured to attach to a baby bottle. The uniquely identified caps 705 may be associated with one or more timers for providing indication of a possible occurrence of a temporal hazard of a perishable food item within a container to which it is attached or otherwise associated. In some exemplary embodiments, the cap 705 is uniquely identified by a particular color. As shown in FIG. 7, the cap 705 may be detachable from the baby bottle via a threaded connection. In some exemplary embodiments, other connections may be used to attach the caps 705 to the container.

Although various embodiments have been described with reference to the Figures, other embodiments are possible. For example, a perishable food timing system may include a plurality of timers each associated with a different one a plurality of visible indicia. For example, each timer may be individually set while using a particular unique identifier. In some exemplary embodiments, the identifying tag be a colored bottle cap. In some exemplary embodiments, the identifying tag may be a sticker attachable to a bottle cap or the bottle itself. In some exemplary embodiments, the identifying tag may be numbered bottle cap or sticker. For example, a numbering scheme may be used to identify a particular climate environment for ease in coordination with the associated timer and threshold for that environment. In some exemplary embodiments, the identifying tag may be a bottle cap or sticker having a barcode. For example, the barcode may be read by a scanner of the computer or in connection with the computer. Once the computer receives the identifying information of the barcode, the software application having the timer may automatically associate incoming identifying information of the barcode with a particular timer or threshold.

In some embodiments the product information can be used by the timers. For example, some products have sell-by dates printed upon the product container. This sell-by date may be input into the timer app to be used in generating temporal hazards. For example, the timer may generate an alarm signal when the sell-by date has arrived. A timer may generate an alarm signal at a predetermined time relative to the sell-by date. The user may program a "time cushion" for use in generating an alarm signal. For example, a timer may generate an alarm signal one week before the sell-by date has arrived. A time may generate alarm signals, for example, each day after a sell-by date has been eclipsed. Each subsequent day's generated alarm signal may be increasingly urgent in its text message, for example. Some perishable products may have other dates associated thereto. For example, a product may have a "please use or freeze by" date. Such time stamps may be input into a timer app and used to generate alarm signals.

The perishable food timing system may include one or more sets of predetermined timing thresholds, each set of predetermined timing thresholds corresponding to a set of temporal hazards associated with a perishable food item, wherein each of the one or more sets of predetermined timing thresholds can be associated with one of the plurality of timers. The perishable food timing system may include a plurality of identifying tags each configured to attach to a food container, and each having one of the plurality of visible indicia to associate a respective food container with a respective timer of the plurality of timers. Each one of the plurality of timers commences an elapsed time count in response to user initiated event, and each of the plurality of timers generates an alarm when the elapsed time count equals one of the one or more sets of predetermined timing thresholds associated with the alarm generating timer.

In an exemplary embodiment, a food container associated with the perishable food timer may be an infant bottle. For example, an identifying tag may attach to the infant bottle. The identifying tag may be a cover in some embodiments. In some embodiments, the identifying tag may attach to a cover, where the cover attaches to the bottle or food storage container. The identifying tag may be a nipple in some embodiments. In some embodiments, the identifying tag may attach to the nipple. In some embodiments, the identifying tag may attach to the bottle itself. In some embodiments, the identifying tag may removably attachable to the bottle or nipple. In some exemplary embodiments, the identifying tag may be integral with the bottle or nipple. In some exemplary embodiments, the food storage container may be a storage bag. For example, storage bags are typically used in the storage of breast milk and other perishable food items. The visible indicia may be written on the storage bag by an individual to associate the storage bag with a particular timer and/or threshold.

In another exemplary embodiment, a food container associated with the perishable food timer may be a Tupperware container. In some exemplary embodiments, the food container may be a plastic container for holding leftover food items. In some exemplary embodiments, the food container may be a Styrofoam container. In some exemplary embodiments, the food container may be casserole dish. In an exemplary embodiment, the identifying tag may be cover for the food container. In some exemplary embodiments, the identifying tag may attach to the cover of the food container.

In some exemplary embodiments, the identifying tag may include a visible indicia. The visible indicia may be a unique marking to permit a user to easily distinguish a particular perishable food container. In some exemplary embodiments, the visible indicia may be a particular or unique color. In some exemplary embodiments, the visible indicia may be a unique design. In some exemplary embodiments, the visible indicia may be slogan or word. In some exemplary embodiments, the visible indicia may be number or representative time duration. In some embodiments, means for associating each of a plurality of timers with a perishable item may include a plurality of unique identification tags. Such unique identification tags may have an identifying symbol disposed thereupon, for example. Some embodiments may use color indicia for identification. Each unique identifier may then be associated with a timer that has a corresponding identification tag, for example.

In an exemplary embodiment, the predetermined threshold may be chosen based on a user-determined temporal hazard of a food item. For example, if the user prefers to cause an alarm to sound if a perishable food item is left in a room temperature environment for more than ten minutes, the user may select the predetermined threshold that most closely matches ten minutes. In another exemplary embodiment, the user may set or adjust the predetermined threshold to the exact desired time duration, such as for example ten minutes. In some exemplary embodiments, the user may choose to leave frozen meat within a freezer for no longer than one year. In the exemplary embodiment, the user may attach an identifying tag, such as a sticker having a visible indicia, to the meat package and set the threshold to one year. If a year passes before the meat is utilized and associated alarm is disabled, then the alarm will sound alerting the user that the meat has reached a predetermined threshold indicating a temporal hazard associated with the meat.

In some exemplary embodiments, the user may enter custom fields associated with each timer. For example, the user may tag a name, location, or identifying information to the timer to prevent the user from forgetting what food item each alarm is associated with. For example, food items in the freezer may be left for long durations before spoilage occurs, thus a custom identifying field associated with the alarm may be helpful. In some exemplary embodiments, a custom identifying tag or visible indicia identifying the food item may be useful. For example, the visible indicia may include information pertaining to the food item, such as a date, temporal hazard duration, or food type.

In some exemplary embodiments, the perishable food timer may communicate wirelessly with a remote device to communicate a timing condition. For example, a food timer may communicate wirelessly with a speaker by sending an alarm signal to the speaker once an elapsed time of the counter meets or exceeds an associated threshold. In some exemplary embodiments, the counter may operate in reverse to count-down and cause the alarm to sound once a zero value is reached.

In some exemplary embodiments, a user may create a unique profile. Any food item that the user monitors may be associated with the profile of the user. In some exemplary embodiments, the user may associate a particular profile with a unique sounding alarm. In some exemplary embodiments, multiple user profiles may be created on a single software application.

Various embodiments may use various methods of supplying power to a timing device. In some embodiments, a battery may be used for this purpose. For example, alkaline batteries may be used. In some embodiments, lithium batteries may be used. In an exemplary embodiment a sliver oxide battery may be used. Some embodiments may include a watch battery for a power source. Other embodiments may employ a super capacitor.

Various embodiments may be used for the safe storage of other items other than food items. For example, the timing device may be used to set a predetermined threshold for storage of pharmaceutical products. In some exemplary embodiments, the timing device may be used to set a predetermined threshold for storage of hygiene products.

In some exemplary embodiments, a total number of storage containers currently associated with one or more timers may be summed by the software application to provide an individual with a total storage bags currently stored. In some exemplary embodiments, the summation may include a total number of storage containers by storage type (e.g., room temperature, refrigerating temperature, freezing temperature). In some exemplary embodiments, each storage container may be associated with a storage volume. In some exemplary embodiments, the software application may calculate a total volume currently stored. In some exemplary embodiments, the software application may provide a usage average per day, week, month, or other time duration for a particular perishable food item. For example, the software application may calculate a total incoming and outgoing food items within a given time period to determine a moving average or usage amount. In some exemplary embodiments, the food storage container may include volume indicators. The individual may manually enter a volume stored for a particular food storage container.

In some exemplary embodiments, a status bar may be provided with each visual indicator of the timer. The status bar may indicate an amount of time or percentage of time before a temporal hazard has occurred. In some exemplary embodiments, a recommendation may be provided by the software application to transfer the contents of a particular food storage container from a first environment to a second environment. For example, if a milk bottle has been in a room temperature environment for 1 hour, the software application may generate an alarm or warning signal indicating that the milk bottle be consumed or moved to a refrigerator environment or a freezer environment within 30 minutes to prevent a temporal hazard from occurring.

In some exemplary embodiments, a net age may be calculated by the software application. For example a perishable food item stored at a given time and a perishable food item stored at a later time, if combined within a singular storage container, may have a net or average age. The average age may take precedent in calculating an elapsed time before a given threshold and temporal hazard.

In some exemplary embodiments, the software application may provide a recommendation to a user on which food container to use next. For example, the software application may track which food container has been stored the longest within a given climate environment. The software application may provide the user with a numbered list having a recommended order in which to use the food containers to best prevent spoilage. In some exemplary embodiments, the particular food storage container recommendation may be based on identifier color or a barcode. For example, if it is determined that a first storage container with a red cover was placed in a refrigerator prior to a second storage container with a blue cap, the software application may provide a recommendation to an individual to consume the perishable food item within the first storage container with the red storage cap before consuming the perishable food item within the second storage container with the blue storage cap.

In some exemplary embodiments, a total storage occurrences of a particular perishable food item may be tracked. For example, if a food storage container having a perishable food item is first stored within a room temperature environment for 1 hour, then moved to a refrigerate temperature environment for 1 day, and then moved to a freezer storage environment for 1 week, the software application may display a detailed history including stored climate environments and durations of the food storage container. In some embodiments, the alarm may indicate that it is time to remove the perishable item from one environment and store it in another environment.

In some exemplary embodiments, the alarm volume may be changed through the user interface. In some exemplary embodiments, the alarm may be dismissed through the user interface. In some exemplary embodiments, a snooze or delay function may be used in conjunction with the alarm. In some exemplary embodiments, a pop-up screen on the computer may permit for ease in control of volume or dismissal of an alarm.

In some exemplary embodiments, if a food storage container, such as breast milk container, has not been added to a storage environment in a given amount of time, then a reminder may take place, such as for example by generating an alarm. For example, if breast milk has not been stored in 4 hours, a reminder may alert a mother to pump or express breast milk.

In various embodiments, various methods of timing temporal hazards associated with perishable foods may be employed. Some such methods have been described, for example, at [0021-0022] and in FIG. 2 of U.S. patent application Ser. No. 14/032,001, titled "Environment-Resolution Correlated Timer," filed by Jason Loomis on Sep. 19, 2013, the entire disclosure of which is hereby incorporated by reference.

In some embodiments, an alarm signal may be in the form of an audible voice warning. For example, when a timer passed a predetermined threshold associated with a temporal hazard, an audible voice warning may say: "do not use." In some embodiments, the audible voice warning may say; "use the baby bottle soon or move it from the fridge to the freezer." In some examples, the audible voice warning may indicate a perishable food object associated with the timer. For example, the audible voice warning may say: "use the baby bottle identified with the yellow indicator next." In some embodiments, an audible voice warning may say: "the item marked with the letter B is due to expire in two hours." In some embodiments, the audible voice warning may increase in intensity when a timing deadline approaches. For example, the audible voice warning may get louder as a timer approaches a predetermined timing threshold.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A perishable food timing system comprising:
   a plurality of timers each associated with a different one of a plurality of visible indicia;
   one or more sets of predetermined timing thresholds, each set of predetermined timing thresholds corresponding to a set of temporal hazards associated with a perishable food item, wherein each of said one or more sets of predetermined timing thresholds can be associated with one of said plurality of timers; and
   a plurality of identifying tags each configured to attach to a food container, and each having one of said plurality of visible indicia to associate a respective food container with a respective timer of said plurality of timers;
   wherein each one of said plurality of timers commences an elapsed time count in response to a user initiated event, and each of said plurality of timers generates an alarm when said elapsed time count equals one of said one or more sets of predetermined timing thresholds associated with said alarm generating timer.

2. The system of claim 1, including a computer having a software application, wherein said software application has said timer.

3. The system of claim 2, wherein said computer is a phone.

4. The system of claim 2, wherein said computer is a tablet.

5. The system of claim 1, wherein said food container is an infant bottle.

6. The system of claim 5, wherein said identifying tag is a cover adapted for attachment to said infant bottle.

7. The system of claim 5, wherein said identifying tag is a bottle cover adapted for attachment to said infant bottle.

8. The system of claim 1, wherein said visible indicia is removably attachable to said food container.

9. The system of claim 1, wherein said visible indicia is integral with said food container.

10. The system of claim 1, wherein said visible indicia is a representative of a particular color.

11. A computer program product (CPP) tangibly embodied in a non-transitory computer readable medium and containing instructions that, when executed, cause a processor to perform operations for generating an alarm signal when a temporal hazard associated with a perishable food item has been determined, the operations comprising:
   receiving, from a user input interface, signals indicative of a start timing command associated with a perishable food item;
   commencing an elapsed timer count in response to the received signal indicative of a start timing command, the elapsed timer count associated with an indicia attachable to the perishable food item;
   retrieving a predetermined timing threshold corresponding to a temporal hazard associated with said perishable food item;
   comparing the elapsed timer count with said predetermined retrieved timing threshold to determine if said associated temporal hazard has occurred; and
   generating an alarm signal when said elapsed timer count has passed said retrieved predetermined timing threshold.

12. The CPP of claim 11, including a step of associating a visible indicia of a stored perishable food item with said start timing command.

13. The CPP of claim 12, wherein said visible indicia is attachable to a food container of said perishable food item.

14. The CPP of claim 13, wherein said visible indicia is a colored cover for an infant bottle.

15. The CPP of claim 13, wherein said visible indicia is a colored bottle cover for an infant bottle.

16. The CPP of claim 11, further including an operation of sending said generated alarm signal to a user interface.

17. The CPP of claim 11, wherein said generated alarm signal is an audible alarm signal.

18. A system for providing a food timer to alert an individual of a programmed event associated with a perishable food item, comprising:
   a plurality of timers;
   one or more sets of predetermined timing thresholds, each set of predetermined timing thresholds corresponding to a set of temporal hazards associated with a perishable food item, wherein each of said one or more sets of predetermined timing thresholds can be associated with one of said plurality of timers; and
   means for associating each of said plurality of timers with a food container;
   wherein each one of said plurality of timers commences an elapsed time count in response to a user initiated event, and each of said plurality of timers generates an alarm when said elapsed time count equals one of said one or more sets of predetermined timing thresholds associated with said alarm generating timer.

19. The system of claim 18, wherein one of said one or more sets of temporal hazards comprises a room temperature spoilage hazard, a refrigerated spoilage hazard, and a freezer spoilage hazard.

20. The system of claim 19, wherein said room temperature spoilage hazard is associated with a first visible indicia, wherein refrigerated spoilage hazard is associated with a second visible indicia, and wherein freezer spoilage hazard is associated with a third visible indicia.

\* \* \* \* \*